United States Patent
Gebhart et al.

(10) Patent No.: US 8,935,371 B2
(45) Date of Patent: Jan. 13, 2015

(54) HIERARCHICAL SYSTEM OPERATION IN AN ADAPTIVE COMPUTING ENVIRONMENT

(75) Inventors: Alexander Gebhart, Akazienweg (DE); Erol Bozak, Vinzentiusstrasse (DE)

(73) Assignee: SAP SE, Walldorf (DE)

( * ) Notice: Subject to any disclaimer, the term of this patent is extended or adjusted under 35 U.S.C. 154(b) by 786 days.

(21) Appl. No.: 12/037,056

(22) Filed: Feb. 25, 2008

(65) Prior Publication Data

US 2009/0216783 A1 Aug. 27, 2009

(51) Int. Cl.
| | |
|---|---|
| *G06F 15/16* | (2006.01) |
| *G06F 15/177* | (2006.01) |
| *G06F 15/173* | (2006.01) |
| *G06F 9/44* | (2006.01) |
| *H04L 5/22* | (2006.01) |
| *G06F 9/48* | (2006.01) |

(52) U.S. Cl.
CPC ..................................... *G06F 9/485* (2013.01)
USPC ........... 709/223; 709/201; 709/221; 709/248; 717/120; 717/121; 370/301

(58) Field of Classification Search
USPC .............. 705/10, 12; 709/201, 221, 223, 248; 707/8, 10, 103 X, 103
See application file for complete search history.

(56) References Cited

U.S. PATENT DOCUMENTS

| | | | | |
|---|---|---|---|---|
| 5,329,626 | A * | 7/1994 | Klein et al. | 709/248 |
| 6,421,700 | B1 * | 7/2002 | Holmes et al. | 718/100 |
| 2002/0156931 | A1 * | 10/2002 | Riedel | 709/313 |
| 2003/0182177 | A1 * | 9/2003 | Gallagher et al. | 705/10 |
| 2005/0188269 | A1 * | 8/2005 | El-Shimi et al. | 714/38 |
| 2005/0239731 | A1 * | 10/2005 | McSwiggen et al. | 514/44 |
| 2005/0267897 | A1 * | 12/2005 | D'Costa et al. | 707/100 |
| 2006/0112388 | A1 * | 5/2006 | Taniguchi et al. | 718/100 |
| 2007/0239731 | A1 * | 10/2007 | Graf et al. | 707/10 |
| 2007/0294668 | A1 * | 12/2007 | Mohindra et al. | 717/120 |
| 2008/0071853 | A1 * | 3/2008 | Mosier et al. | 709/201 |
| 2008/0126856 | A1 * | 5/2008 | Levidow et al. | 714/19 |
| 2013/0275944 | A1 * | 10/2013 | Keller | 717/123 |

OTHER PUBLICATIONS

Ling Liu; Pu, C.; Wei Tang, "Continual queries for Internet scale event-driven information delivery," Knowledge and Data Engineering, IEEE Transactions on , vol. 11, No. 4, pp. 610,628, Jul./Aug. 1999.*

* cited by examiner

*Primary Examiner* — Taylor Elfervig
(74) *Attorney, Agent, or Firm* — Mintz Levin Cohn Ferris Glovsky and Popeo, P.C.

(57) ABSTRACT

Methods and apparatus, including computer program products, are provided for controlling the state of components of a system. In one aspect, there is provided a computer-implemented method. The method may include receiving a request to place a system into a state. The system may include one or more components of a distributed computing system. A controller may place, based on a defined structure for the system, the one or more components into the state by sending one or more messages to the one or more components. Related apparatus, systems, methods, and articles are also described.

17 Claims, 10 Drawing Sheets

HIERARCHICAL SYSTEM OPERATION IN AN ADAPTIVE COMPUTING ENVIRONMENT

FIELD

The present disclosure generally relates to distributed computing. More particularly, the present disclosure relates to controlling operation of components of a distributed computing system.

BACKGROUND

Computers have now become an integral part of our society both in business and in residential settings. Almost every business of sufficient size in Germany, the United States, and other developed countries has one or more computers to assist them in running their businesses. Similarly, many families in those countries now have computers at home that are used to run various applications including games.

Some attribute the popularity of computers to the Internet. The Internet provides people with ready access to vast amounts of data. Many people now get their news, sports, stock, entertainment, and other information primarily from the Internet. Businesses have also embraced the Internet. The Internet provides the opportunity for computers to communicate instantly with other computers or individuals. Business processes that were once restricted to intranets and their users are now moving to the Internet. Accordingly, companies are moving more and more of their data to electronic forms. In addition, companies have amassed huge amounts of data in an effort to understand their business, improve performance, and build stronger employee, customer, and partner relationships.

Today, distributed computing systems (including adaptive computing environments) are widely used by various organizations to accommodate the ever-increasing demand for computer resources from consumers and businesses alike. In a distributed computing system, nodes (e.g., computers, processors, servers, etc.) are organized to perform certain functions. One example of a distributed computing environment is NetWeaver Adaptive Computing infrastructure, including an Adaptive Computing Controller (commercially available from SAP, AG). Other examples of distributed computing environments include an ABAP-based system or a J2EE-based system (e.g., including a dispatcher, one or more application servers, and a database).

SUMMARY

The subject matter disclosed herein provides methods and apparatus, including computer program products, for control components of a distributed computing system.

In one aspect, there is provided a computer-implemented method. The method may include receiving a request to place a system into a state. The system may include one or more components of a distributed computing system. A controller may place, based on a defined structure for the system, the one or more components into the state by sending one or more messages to the one or more components. Related apparatus, systems, methods, and articles are also described.

The subject matter described herein may be implemented to realize the advantage of enhanced control of components of a distributed computing system and, in particular, enhanced control of the state of those components.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

Figure 1:
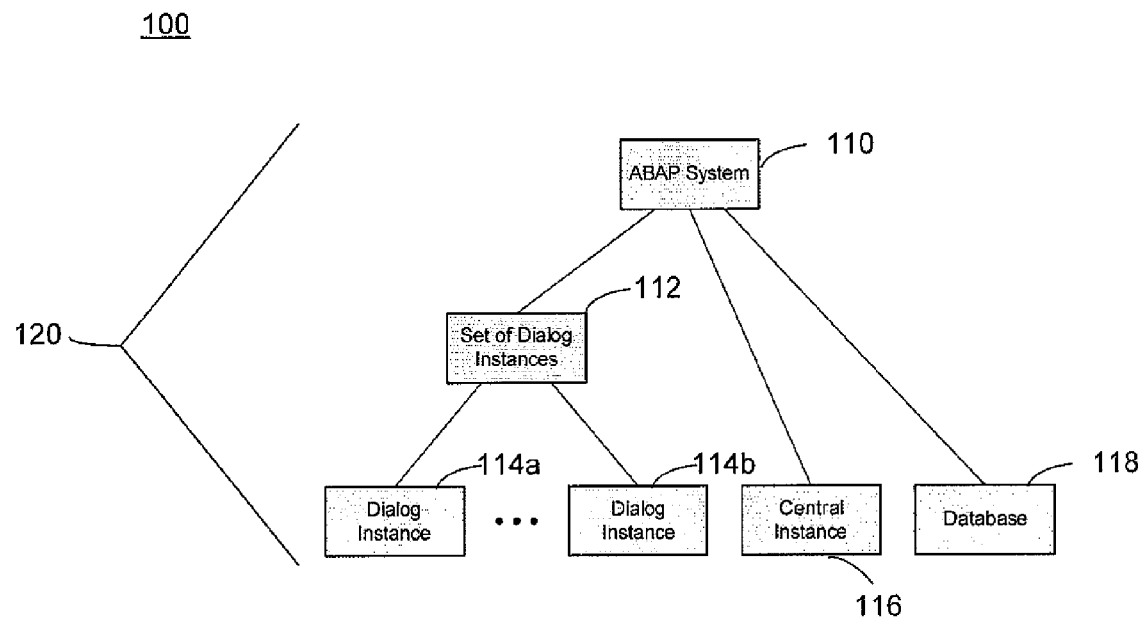
FIG. 1 depicts a block diagram of a system including components which may be controlled according to the subject matter described herein.

Like labels are used to refer to same or similar items in the drawings.

DETAILED DESCRIPTION

Systems, such an ABAP (Advanced Business Application Programming) system or a Java 2 Platform, Enterprise Edition (J2EE) system, are composed of multiple components running in a distributed manner. In some implementations, these components may be implemented as a cluster. In a system implementing J2EE, the components may include a dispatcher (e.g., for dispatching messages), one or more application servers, and a database. In this example, these components comprise a J2EE system and can be operated individually on dedicated hosts (e.g., physical or virtual hosts). Each component (also referred to as a unit or an "execution unit") may provide operations, including a "start" operation to start the component, a "stop" operation to stop the component, and a "restart" operation to restart the component that has been stopped. For example, a component of an application server may be started, stopped, and restarted. In some cases, an operation may have dependencies to a certain state of the system. For example, in order to start all application servers of a J2EE system, the database should be in a "running" state. These dependencies may be considered when executing operations on a particular component so that the overall state of the system is maintained.

The subject matter described herein provides a system hierarchy for associating operations, states, and dependencies to the components of the systems. The subject matter described herein also defines a mechanism to execute operations (also referred to as actions) in a structure taking into account the dependencies and the states of the components, so that a coherent and consistent operation of the system is maintained. Moreover, the state dependencies among distributed components may be managed automatically (e.g., state dependencies are taken into account when calculating the right sequence of operations to bring a system into a consistent state).

FIG. 1 depicts a block diagram of a system 100 (e.g. an ABAP system) including a hierarchical structure 120 of components of system 100. The hierarchical structure 120 includes a root node, such as node 110 corresponding to an ABAP system 100. The system 100 represents a coherent set of components. Although the example of FIG. 1 refers to an ABAP-based clustered application server-based system, the subject matter described herein may be used in other systems as well. The term "coherent" refers to maintaining components in an appropriate state. The other nodes in hierarchical structure 120 represent so-called "leaf nodes" 114a-b, 116, and 118 corresponding to execution units, i.e., components that can be executed as part of one or more programs. Any intermediate nodes (e.g., node 112) represent structure elements to enable grouping of components.

In the example of FIG. 1, leaf nodes 114a-b correspond to dialog instances, which are grouped under the intermediate node set of dialog instances 112, although other groupings may be arranged as well (e.g., the central instance 116 and the database 118 may be grouped together under an intermediate node). The hierarchy 120 of FIG. 1 is exemplary since other structures and components may be used as well.

Central instance 116 may be implemented as an application server. In some implementations, central instance 116 controls the processes among (and within) nodes of a cluster and may include a message server for communications. In some cases, central instance 116 (also referred to as a "dispatcher") may include a message server for communications, and include an associated system identifier (SID) identifying the cluster to a cluster manager and/or a cluster registry.

The dialog instances 114a and b may also be implemented as application servers. For example, a dialog instance may be configured on a cluster as an application server providing applications, such as a customer relationship management (CRM) application, an enterprise resource planning (ERP) application, a product lifecycle management application, a supply chain management (SCM) application, a supplier relationship management application, as well as any other application. When a client computer accesses an SCM application at the central instance, it is dispatched to any of the dialog instances and from then on, an instance of the SCM application runs on the host on which the dialog instance runs. If another client computer accesses the central instance, the SCM application may be served from a different dialog instance or from the same dialog instance. In this example, the dialog instance operates as an application server that wraps each instance of the SCM application, so that the two SCM applications can run independently regardless of whether they run on the same or different nodes within the cluster.

System 100 also depicts an instance of a database 118. In some implementations, dialog instances 114a-b, central instance 116, and database 118 are implemented as part of a cluster, although the subject matter described herein may be implemented in systems other than clusters.

Each execution unit (i.e., components), such as dialog instances 114a-b, central instances 116, and databases 118 may have an associated state model. A state model is a description of the state of a system, such as the state of the components 114a-b, 116, and 118. The state model may be presented graphically using nodes and edges. A node represents a state and an edge represents a state transition with an associated action (also referred to as an operation).

Figure 2:
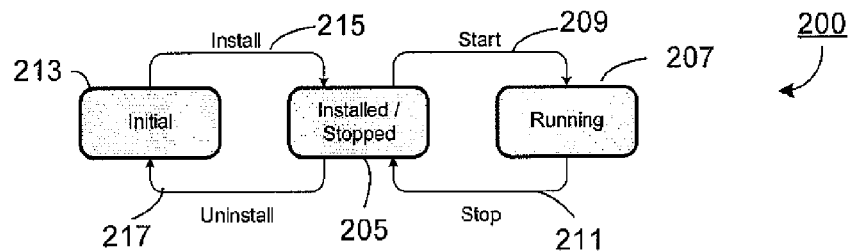
FIG. 2 depicts a state model.

FIG. 2 depicts an example of a state model 200. For example, one of the execution units, such as dialog instances 114a-b, central instances 116, and database 118, may be in an installed/stopped state 205. To transition from installed/stopped state 205 to a running state 207, a start action 209 must be implemented. To transition from running state 207 to installed/stopped state 205, a stop action 211 must be implemented. To transition from an initial state 213 to installed/stopped state 205, an install action 215 must be implemented. To transition from installed/stopped state 205 to initial state 213, an uninstall action 217 must be implemented. The states and actions of FIG. 2 are only exemplary since other actions and states may be associated with a component.

Figure 3:
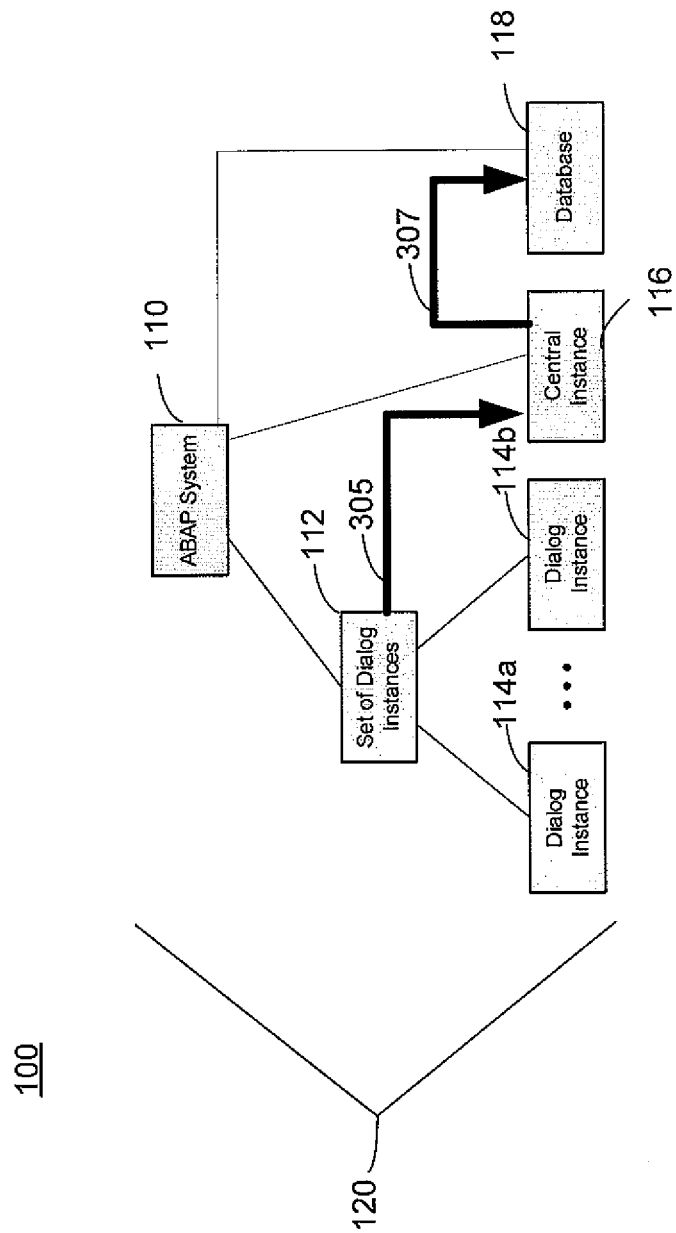
FIG. 3 depicts a state model including execution dependencies.

FIG. 3 depicts the system 100 of FIG. 1 with the addition of execution dependencies 305 and 307. The system 100 may include zero or more execution dependencies to define conditions for execution of an action at a component of system 100. For example, execution dependency 305 defines that the start (i.e., the running) of the set of dialog instances 114a-b depends on the start of central instance 116. For example, central instance 116 must be running (e.g., in running state 207 at FIG. 2) before dialog instances 114a-b may be started.

FIG. 3 also depicts execution dependency 307. Execution dependency 307 defines that the start of central instance 116 depends on the start of database 118. Specifically, database 118 must be in a running state 207 before the central instance 116 may be started. Although FIG. 3 depicts execution dependencies 305 and 307, other execution dependencies may be implemented as well.

In some implementations, execution dependencies among components of a system may be aggregated. When aggregation is used, any execution dependencies that are defined are valid for all nodes (also referred to as subnodes) of the aggregation. For example, the execution dependency 305 defined for set of dialog instances 112 is valid for all the other nodes in the aggregation, such as dialog instances 114a-b.

Figure 4B:
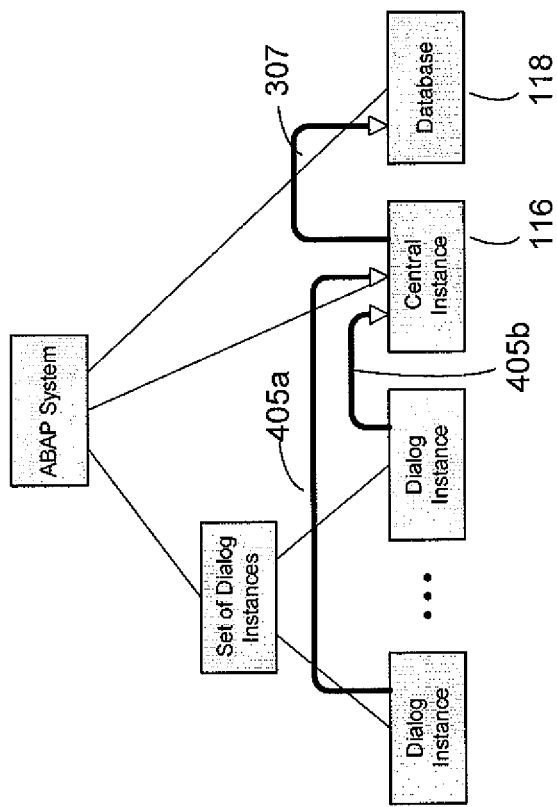
FIGS. 4a and 4b depict execution dependencies and equivalent execution dependencies.
Figure 4A:
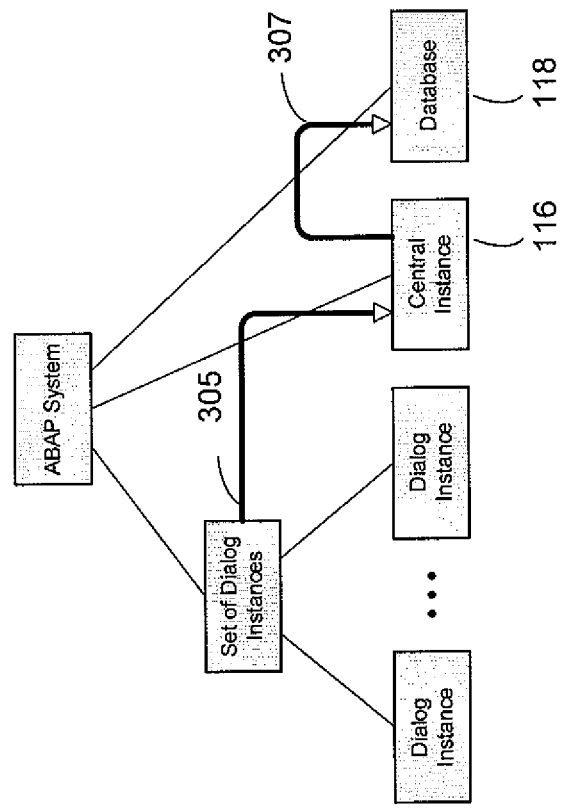

FIGS. 4a and b depict so-called "equivalent dependency structures." Specifically, FIG. 4a depicts that execution dependency 305 defined for set of dialog instances 112 is valid for all the other nodes in the aggregation, such as dialog instances 114a-b. One the other hand, FIG. 4b depicts equivalent execution dependencies 405a-b defined for each of the dialog instances 114a-b. Execution dependencies 405a-b are equivalent to, i.e., yielding the same outcome as, execution dependency 305 (e.g., central instance 116 must be in a running state 207 before dialog instances 114a-b may be started).

A node from which an execution dependency is defined is a "dependent node of the dependency," and the node to which the execution dependency is defined is a "dependant node of the dependency." Referring again to FIGS. 4a-b, central instance 116 is defined as a dependent node, while database 118 is defined as a dependant node. Moreover, a dependency between two nodes, i.e., components, may be used to link a state model of the dependent node with a state model of the dependant node.

Figure 5:
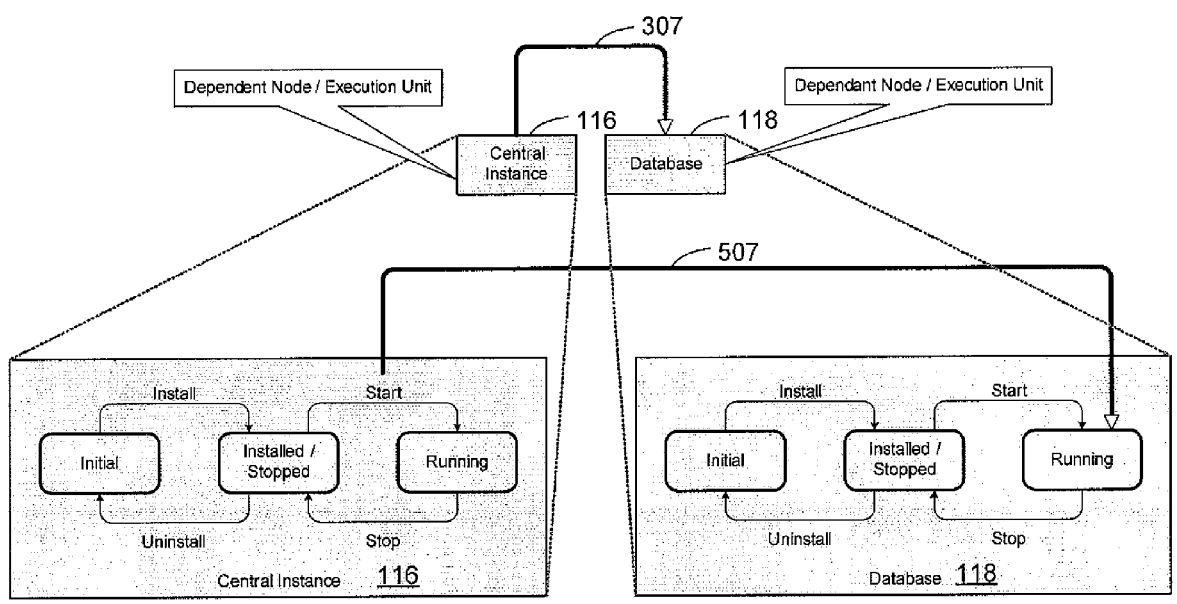
FIG. 5 depicts linking the state models of components of a system.

FIG. 5 depicts a link defined to represent an association of a state model of a dependent node with a model of a dependant node. For example, execution dependency 307 (FIG. 3) is implemented as a link 507 for associating a start action of central instance 116 to the running state of database 118. The link 507 thus defines that central instance 116 may be started only when database 118 is running. Although FIG. 5 depicts link 507 other execution dependencies may be used as well.

Figure 6:
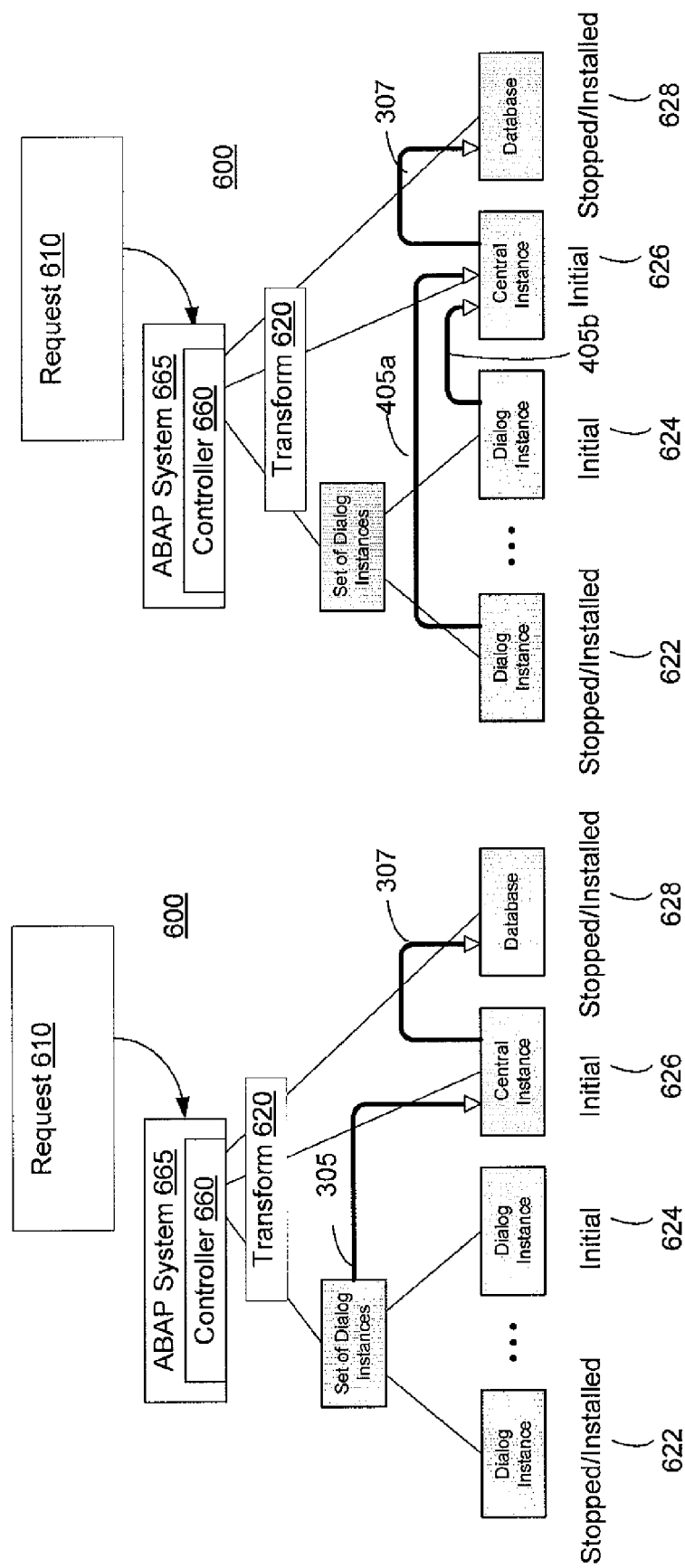
FIGS. 6a and 6b depict receiving a request to place a system in a desired state.

FIG. 6a depicts a request, such as a message 610 that is received by a controller 660. Although controller 660 is depicted at system 665, the controller 660 may be located at other locations as well. The controller 660 manages the state of the distributed application. Moreover, controller 660 propagates the received message (e.g., provided to, sent, and the like) to one or more leaf nodes, such as dialog instances 114*a-b*, central instance 116, and database instance 118. For example, request 610 may correspond to a request to place (e.g., transform, change, and/or maintain) system 100 in a running state.

In some cases, the controller 660 receives a request 610. The request 610 may represent a user request that the overall system (e.g., the root nodes 622-628) be placed in a certain state. In other cases, the request 610 may refer to any other node and a state of that node as well. Although controller 610 is depicted in ABAP system 665, controller 610 may be implemented in a variety of ways, such as incorporated into a central management system that remotely performs the operations on the (leaf) nodes, as a separate service or component that can be utilized by ABAP system 665, and the like. To illustrate, an administrator may request a stop of the overall system to perform maintenance. Rather than issue stop commands to each of the individual components, controller 610 issues the request once for the whole system 600 and the controller 610 initiates stop operations in the correct sequence to maintain state coherency of the components.

FIG. 6*a* depicts that components 114*a-b*, 116, and 118 are in various states, none of which are in a running state. Specifically, dialog instance 114*a* is in a stopped/installed state 622, dialog instance 114*b* is in an initial state 624, central instance 116 is in an initial state 626, and database 118 is in a stopped/installed state 628. In the example of FIG. 6*a*, request 610 is propagated to transform system 100 into a running state (e.g., transform all execution units, such as dialog instances 114*a-b*, central instance 116, and database instance 118, into a running state). In cases where a component is in a running state when request 610 is received, the transformation of that component may comprise no action or, alternatively, a confirmation that the component is indeed in a running state.

The execution dependencies of system 100 may be propagated down through hierarchy 120. For example, the execution dependencies depicted in FIG. 6*a* are propagated down to other nodes to provide an equivalent structure. FIG. 6*b* depicts the result of that propagation. As can be seen from FIG. 6*b*, the execution dependency 305 (FIG. 6*a*) is normalized to provide execution dependencies 405*a* and *b*.

Figure 7:
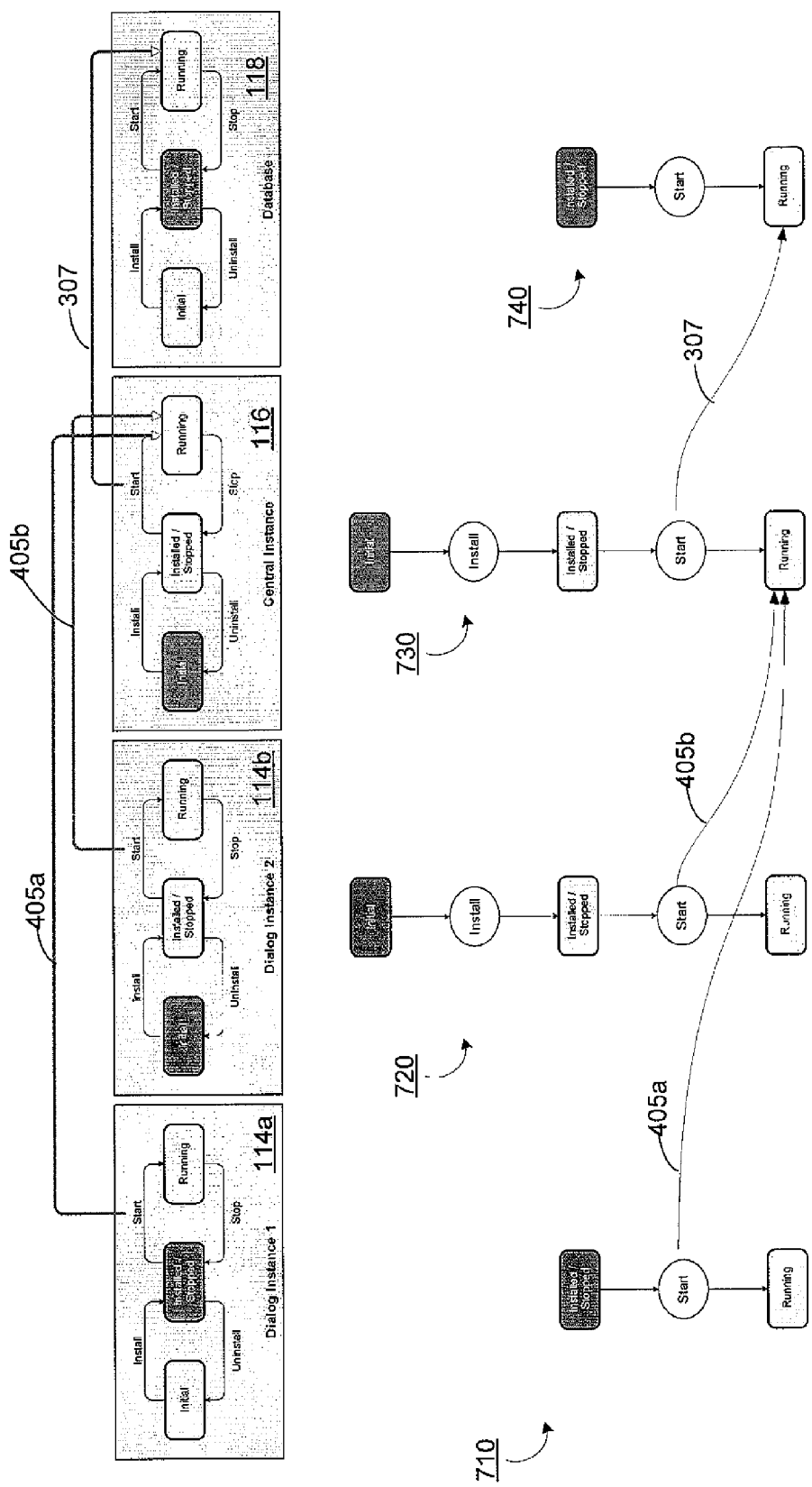
FIG. 7 depicts state models and sequences for each of the components of the system of FIG. 1.

For each execution node (i.e., a component), the sequence of actions are determined to reach a desired state (in this case a "running state" as requested in message 610). FIG. 7 depicts the state models of dialog instances 114*a-b*, central instance 116, and database instance 118, as well as their execution dependencies 405*a-b*, and 307. A graph search algorithm may be used to determine the sequence of actions to reach the desired state. When dialog instance 114*a* is in an installed/stopped state, the sequence 710 to enter a running state is to perform a start action. In the example of dialog instance 114*b*, when it is in an initial state, the sequence 720 required to obtain a running state is perform an install action, enter install/stopped state, and then perform a start action. In the example of central instance 116, when it is in an initial state, the sequence 730 required to enter a running state is perform an install action, enter install/stopped state, and then perform a start action. When database instance 118 is in an installed/stopped state, the sequence 740 required to enter a running state is perform a start action.

In some implementations, sequences 710-740 may also include execution dependencies, such as execution dependencies 405*a-b* and 307. When this is the case, each of the sequences 710-740 are implemented considering the execution dependencies. For example, sequence 710 of dialog instance 114*a* cannot allow a start action until execution dependency 405*a* is satisfied, which in this case represents that central instance 116 is in a running state. Likewise, sequence 720 of dialog instance 114*b* cannot allow a start action until execution dependency 405*b* is satisfied, which in this case also represents that central instance 116 is in a running state. Sequence 730 of central instance 116 may not execute a start action until execution dependency 307 is satisfied, i.e., database 118 is in a running state.

Figure 8:
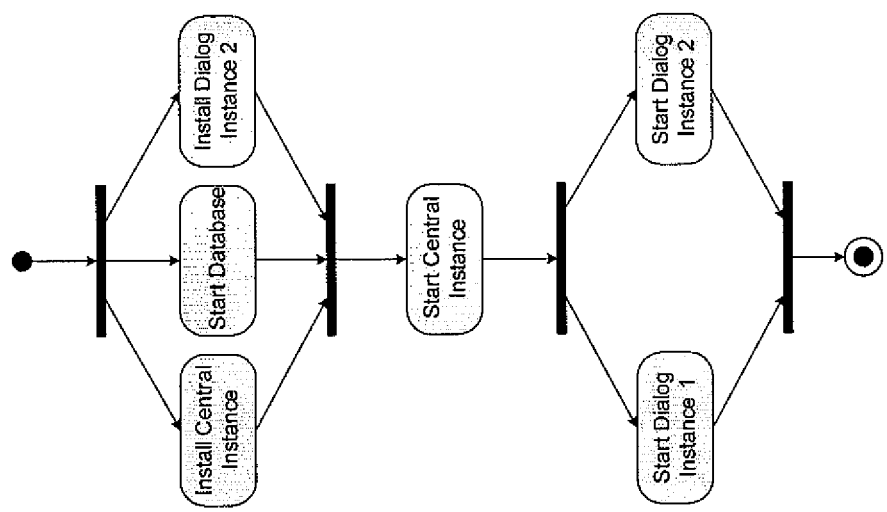
FIG. 8 depicts a process graph for the sequences of FIG. 7.

In some implementations, sequences 710-740 may be implemented as a process graph. FIG. 8 depicts a process graph 800 incorporating sequences 710-740 and execution dependencies 405*a-b* and 307. Moreover, the process of converting sequences 710-740 to process graph 800 may be performed using a task graph algorithm.

Figure 9:
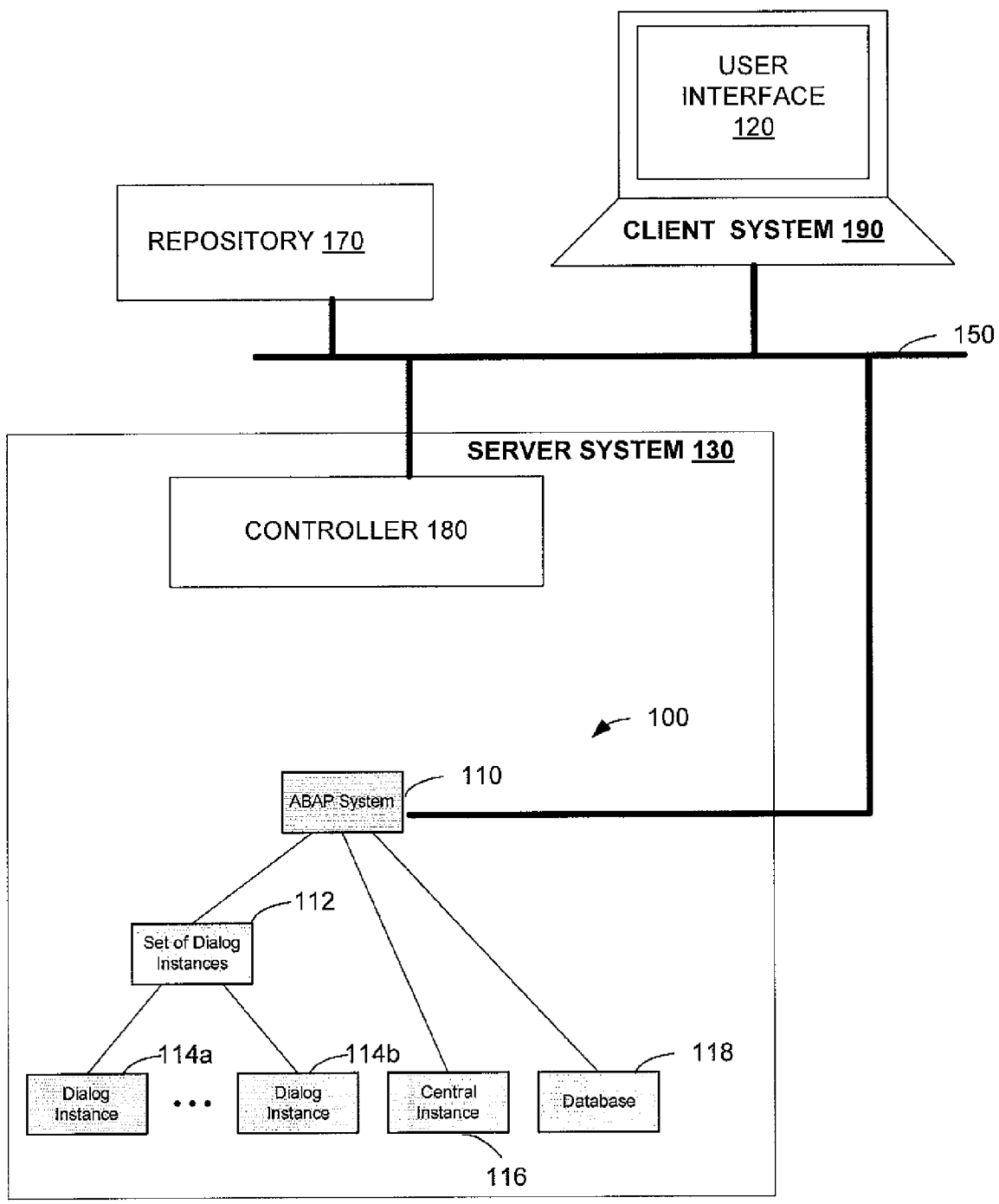
FIG. 9 depicts a controller for controlling the state of the components of a system.

FIG. 9 depicts an exemplary system 900 including a controller 180 for controlling the components 114*a-b*, 116, and 118 of system 100.

The system 900 includes a client system 190 coupled to a server system 130 through a communication mechanism 150 (e.g., a network, the Internet, an intranet, inter-process communication, or a combination of the aforementioned communication mechanisms). The client system 190 may be implemented as a processor, such as a computer. The server system 130 may be implemented as one or more processors, such as one or more servers, one or more blades, and the like.

The client system 190 further includes one or more applications, such as a user interface 120. The user interface 120 may be any application used to interface with other applications, such as programs, services, web services, and the like. For example, the user interface 120 may include a browser or client application to interface with (and/or access) controller 180 and ABAP system 100.

Controller 180 may be implemented as a program or component, i.e., a small binary object (e.g., an applet) or program that performs a specific function and is designed in such a way to operate easily with other components and applications. In some implementations, controller 180 is implemented as part of SAP's Adaptive Computing Controller to manage the state of one or more components of a system. The controller 180 may perform one or more of the following functions: defining one or more of a system hierarchy, a state model, an execution dependency, a sequence, and a process graph; receiving requests to transform components of a system to a desired state; normalize dependencies; determine actions to place a component in a desired state based on a defined structure, e.g., using at least one of sequences 710-740 and process graph 800.

Repository 170 may be implemented as a storage device (e.g., disk drive and the like). Moreover, repository 170 may store system hierarchies, state models, execution dependencies, sequences, and process graphs, all of which are described above. Furthermore, in some implementations, repository 170 may be implemented to provide persistence to database 118. As used herein, the term structure refers to at least one of a sequence, such as sequences 710-740, or a process graph, such as process graph 800.

In some implementations, controller 180 may define one or more aspects of the system hierarchies, state models, execution dependencies, sequences, and process graphs, all of which may be used to control (e.g., transform) the state of components of a system, such as ABAP system 100, into a desired state. Moreover, controller 180 may be similar to controller 660 described above with respect to FIG. 6*a-b* receiving requests to place a system (of a component) in a state and propagating that request to the appropriate components in the correct sequence.

Figure 10:
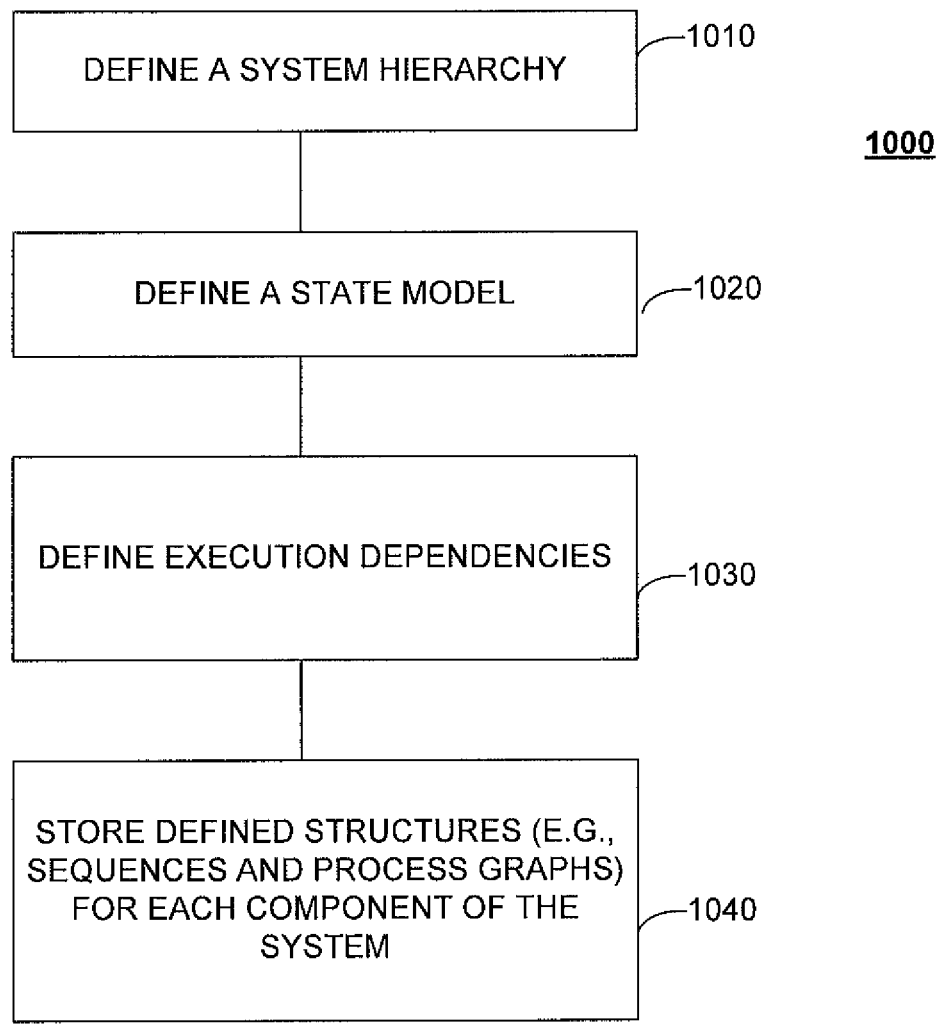
FIG. 10 depicts a process for defining a system hierarchy, a state model, execution dependencies, and structures.

FIG. 10 depicts a process 1000 for defining one or more aspects, which may be used to control components of a system. At 1010, controller 180 may define a system hierarchy, such as system hierarchy 120 (FIG. 2). The defined system hierarchy may be stored in repository 170. In some implementations, user interface 120 is used as well as controller 180 to define system hierarchy 120.

At 1020, controller 180 may be used to define one or more state models. For example, controller 180 may be used to define state models for each of the components of the system hierarchy defined in 1010. In some implementations, the state model may be implemented as described above with respect to FIG. 2, although other state models may be defined as well. The defined state model may be stored in repository 170. In some implementations, user interface 120 is used as well as controller 180 to define one or more state models.

At 1030, controller 180 may be used to define one or more execution dependencies. For example, controller 180 may be used to define execution dependencies 305, 307, and 405*a* and 405*b*, although other execution dependencies may be defined as well. The defined execution dependencies may be stored in repository 170. In some implementations, user interface 120 is used as well as controller 180 to define one or more execution dependencies.

At 1040, controller 190 may be used to store one or more structures (e.g., sequences 710-740, process graph 800, and the like) defined for each component of the system hierarchy. For example, controller 180 may define sequences 710-740 (FIG. 7) and include execution dependencies 405*a-b* and 307, although other sequences or process graphs may be defined as well. In some implementations, user interface 120 is used as well as controller 180 to define the structure for each component of the defined system hierarchy. The defined structures may be stored in repository 170.

Figure 11:
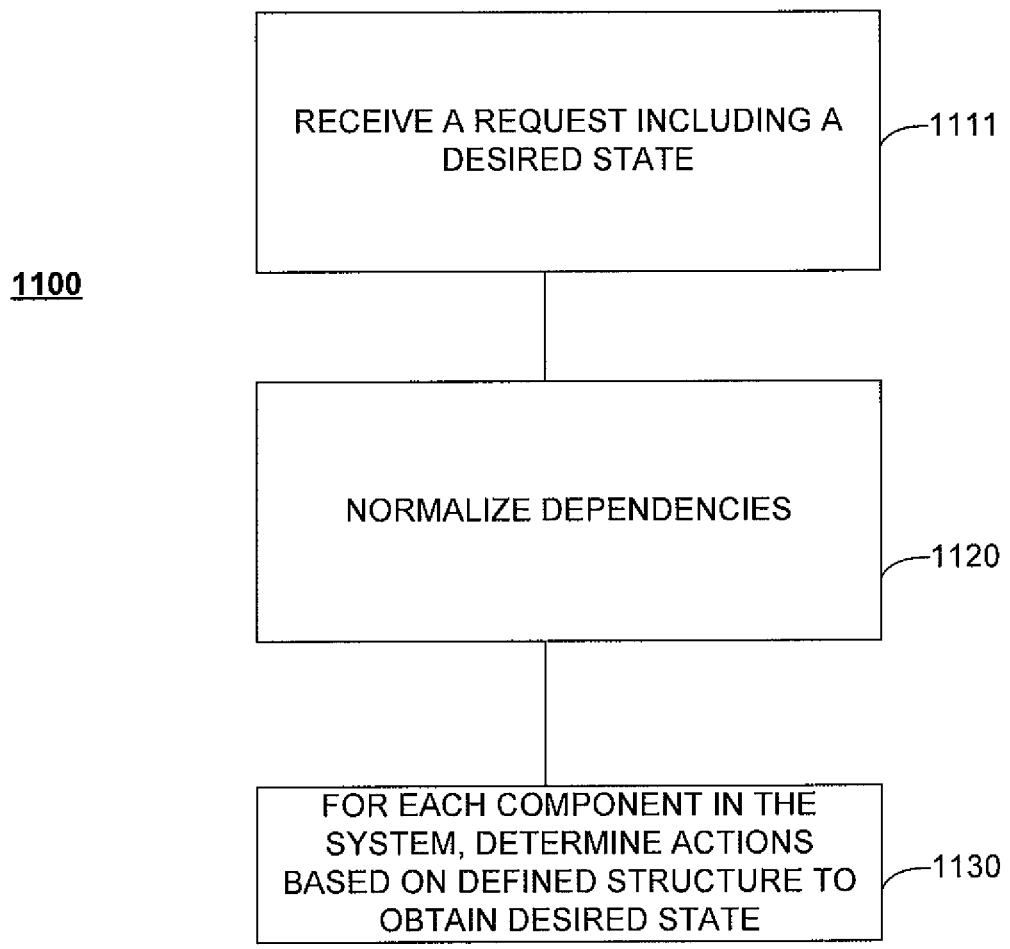
FIG. 11 depicts a process for placing components of a system into a state.

FIG. 11 depicts a process 1100 for placing a system into a state based aspects defined in process 1000. The process 1100 may be implemented to enable a distributed computing system, such as a system including dialog instances, central instances, database instances, as well as any other applications and application servers, to be placed into a specific state. The distributed computing system may be implemented as a cluster system, such as SAP's NetWeaver including SAP's Adaptive Computing Controller. Moreover, the above-described controller 180 may be incorporated into other system managers, including the Adaptive Computing Controller.

At 1110, controller 180 receives a request to place the defined hierarchical system into a desired state. For example, the request may be implemented as request 610. Although some of the examples described herein refer to a request being received in connection with a so-called "root node," the request may be received for other nodes within the hierarchy. In some cases, the controller may process requests for any node in the hierarchy. When a request refers to a node where the dependencies are defined not only in the sub-tree, the dependency information allows a determination of the dependent components and their states. Specifically, if, for example, an administrator chooses to start the set of dialog instances, the administrator does not need to understand the state of the central instance and the database because the controller (e.g., controller 180 or 660) using the processes described herein is able to determine any missing (e.g., unidentified) components due to the controller having the dependency information from the dialog instances to the other parts of the hierarchy, such as the database and central instance.

The request 610 may be implemented as one or more messages. Moreover, request 610 may indicate that the hierarchical system 120 (e.g., defined in 1010) may be placed in a desired state, such as one of a running state, an initial state, and an installed/stopped state (see, e.g., FIG. 2).

For example, referring again to FIG. 6*a*, request 610 may be received. The request 610 corresponds to a request to place (e.g., transform, change, and/or maintain) system 100 (or the system hierarchy 120) in a running state. Specifically, components 114*a-b*, 116, and 118 may be placed in a running state from their various states. Controller 180 may use the defined structure (e.g., sequences 710-740 or process graph 800) to initiate one or more actions transforming components of system 100 into a running state.

Referring again to FIG. 11, at 1120, controller 180 may normalize dependencies associated with the system hierarchy. Specifically, execution dependencies may be propagated down through (e.g., provided to) the system hierarchy 120. For example, the execution dependencies depicted in FIG. 6*a* may be propagated down by controller 180 to other components to provide an equivalent structure, such as the equivalent structure depicted in FIG. 6*b*. In the example of FIG. 6*b*, the execution dependency 305 is normalized to provide execution dependencies 405*a-b*.

At 1130, controller 180 may determine, for each component of the system defined hierarchy, actions (e.g., operations) to place the system in a desired state, as defined in the request received in 1010. For example, controller 180 may use a defined structure (e.g., sequence graphs (FIG. 7) or process graphs (FIG. 8)) to initiate one or more actions. Referring to process graph 800 at FIG. 8, the controller 180 may initiate the installation of central instance 114*b*, installation of central instance 114*b*, and start of database 118. Once those three tasks are completed, controller 180 may initiate the start of central instance 114*a*. When the start of central instance 114*a* is complete and running, controller 180 may initiate a start of dialog instance 114*a* and start dialog instance 114*b*. At this point all four components (i.e., dialog instances 114*a-b*, central instance 116, and database instance 118) have been placed in a running state. The term initiate refers to either implementing a task (e.g., a start, install, and the like) or performing the task. For example, controller 180 may initiate a start by sending a message to another entity to perform the start or may initiate the start by actually performing the start.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed embodiments may be implemented in various environments. Such environments and related applications may be specially constructed for performing the various processes and operations according to the disclosed embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Moreover, although the subject matter described above was described with respect to ABAP, central instances, dialog instances, and databases, the subject matter described herein may be used with other applications.

The foregoing description is intended to illustrate but not to limit the scope of the invention, which is defined by the scope of the appended claims. Other embodiments are within the scope of the following claims.

What is claimed:

1. A non-transitory computer-readable storage medium containing instructions to configure a processor to perform a method, the method comprising:
   receiving, at a controller, a request to place a distributed computing system into a state selected from a plurality of possible states, the distributed computing system further comprising one or more components; and
   placing, by the controller, based on a defined structure, the one or more components into the requested state by sending one or more messages to the one or more components,
   wherein the plurality of possible states comprise an initial state, an installed and stopped state, and a running state,
   wherein the defined structure includes information about at least one or more execution dependencies among the one or more components, a state transition information indicating an action for transitioning between the plurality of possible states, and the plurality of possible states,
   wherein the placing further comprises providing an equivalent structure for the one or more components by at least propagating the one or more execution dependencies through the defined structure, the propagating yielding one or more equivalent execution dependencies that yield an identical outcome as the one or more execution dependencies,
   wherein the state transition information comprises at least one of an install action, a start action, a stop action, and an uninstall action,
   wherein the distributed computing system comprising the one or more components forms a cluster including a central instance, a dialog instance, and a database instance,
   wherein the one or more components are placed into the requested state by performing a sequence of actions at one or more of the central instance, the dialog instance, and the database instance,
   wherein the sequence of actions at the central instance, the dialog instance, and the database instance are linked together, and
   wherein the sequence is based on at least the equivalent structure.

2. The non-transitory computer-readable storage medium of claim 1 further comprising:
   using a process graph to perform the placing.

3. The non-transitory computer-readable storage medium of claim 1 further comprising:
   determining, for each of the one or more components of the defined structure, the actions to obtain the state, wherein the determination further comprises determining the execution dependency between two of the one or more components using the equivalent structure, the execution dependency defining the sequence for execution of the two components.

4. The non-transitory computer-readable storage medium of claim 1 further comprising:
   using, as the defined structure, a hierarchy including at least two leaf nodes representing execution units.

5. The non-transitory computer-readable storage medium of claim 4 further comprising:
   defining, for the hierarchy, a plurality of execution dependencies between the at least two leaf nodes.

6. The non-transitory computer-readable storage medium of claim 5 further comprising:
   storing the hierarchy including the plurality of execution dependencies as at least one of a state model and a process graph.

7. A computer-implemented method comprising:
   receiving, at a controller, a request to place a distributed computing system into a state selected from a plurality of possible states, the distributed computing system further comprising one or more components; and
   placing, by the controller, based on a defined structure, the one or more components into the requested state by sending one or more messages to the one or more components,
   wherein the plurality of possible states comprise an initial state, an installed and stopped state, and a running state,
   wherein at least one of the receiving and the placing are implemented on a computer,
   wherein the defined structure includes information about at least one or more execution dependencies among the one or more components, a state transition information indicating an action for transitioning between the plurality of possible states, and the plurality of possible states,
   wherein the placing further comprises providing an equivalent structure for the one or more components by at least propagating the one or more execution dependencies through the defined structure, the propagating yielding one or more equivalent execution dependencies that yield an identical outcome as the one or more execution dependencies,
   wherein the state transition information comprises at least one of an install action, a start action, a stop action, and an uninstall action,
   wherein the distributed computing system comprising the one or more components forms a cluster including a central instance, a dialog instance, and a database instance,
   wherein the one or more components are placed into the requested state by performing a sequence of actions at one or more of the central instance, the dialog instance, and the database instance,
   wherein the sequence of actions at the central instance, the dialog instance, and the database instance are linked together, and
   wherein the sequence is based on at least the equivalent structure.

8. The computer-implemented method of claim 7 further comprising:
   using a process graph to perform the placing.

9. The computer-implemented method of claim 7 further comprising:
   determining, for each of the one or more components of the defined structure, the actions to obtain the state.

10. The computer-implemented method of claim 7 further comprising:

using, as the defined structure, a hierarchy including at least two leaf nodes representing execution units.

11. The computer-implemented method of claim 10 further comprising:
defining, for the hierarchy, a plurality of execution dependencies between the at least two leaf nodes.

12. The computer-implemented method of claim 11 further comprising:
storing the hierarchy including the plurality of execution dependencies as at least one of a state model and a process graph.

13. A system comprising:
a processor; and
a memory, wherein the processor and the memory are configured to perform a method comprising:
receiving, at a controller, a request to place a distributed computing system into a state selected from a plurality of possible states, the distributed computing system further comprising one or more components; and
placing, by the controller, based on a defined structure, the one or more components into the requested state by sending one or more messages to the one or more components,
wherein the plurality of possible states comprise an initial state, an installed and stopped state, and a running state,
wherein the defined structure includes information about at least one or more execution dependencies among the one or more components, a state transition information indicating an action for transitioning between the plurality of possible states, and the plurality of possible states,
wherein the placing further comprises providing an equivalent structure for the one or more components by at least propagating the one or more execution dependencies through the defined structure, the propagating yielding one or more equivalent execution dependencies that yield an identical outcome as the one or more execution dependencies,
wherein the state transition information comprises at least one of an install action, a start action, a stop action, and an uninstall action,
wherein the distributed computing system comprising the one or more components forms a cluster including a central instance, a dialog instance, and a database instance,
wherein the one or more components are placed into the requested state by performing a sequence of actions at one or more of the central instance, the dialog instance, and the database instance,
wherein the sequence of actions at the central instance, the dialog instance, and the database instance are linked together, and
wherein the sequence is based on at least the equivalent structure.

14. The system of claim 13 further comprising:
using a process graph to perform the placing.

15. The system of claim 13 further comprising:
determining, for each of the one or more components of the defined structure, the actions to obtain the state.

16. The system of claim 13 further comprising:
using, as the defined structure, a hierarchy including at least two leaf nodes representing execution units.

17. The system of claim 16 further comprising:
defining, for the hierarchy, a plurality of execution dependencies between the at least two leaf nodes.

* * * * *